US012752354B2

(12) United States Patent
Pai

(10) Patent No.: US 12,752,354 B2
(45) Date of Patent: Oct. 6, 2026

(54) DUST COLLECTION STRUCTURE OF BAND SAW MACHINE

(71) Applicant: OAV EQUIPMENT AND TOOLS, INC., Taichung City (TW)

(72) Inventor: Wen-Lung Pai, Taichung City (TW)

(73) Assignee: OAV EQUIPMENT AND TOOLS, INC., Taichung City (TW)

( * ) Notice: Subject to any disclaimer, the term of this patent is extended or adjusted under 35 U.S.C. 154(b) by 178 days.

(21) Appl. No.: 18/786,997

(22) Filed: Jul. 29, 2024

(65) Prior Publication Data

US 2025/0339909 A1 Nov. 6, 2025

(30) Foreign Application Priority Data

May 6, 2024 (TW) ................................. 113116730

(51) Int. Cl.
*B23D 59/00* (2006.01)

(52) U.S. Cl.
CPC .................................. *B23D 59/006* (2013.01)

(58) Field of Classification Search
CPC .............. B23D 59/006; B23D 59/0062; B23D 59/0064; B23D 55/026; B23D 47/02; B23D 47/025; B27G 3/00; B23Q 11/0042; B23Q 11/0046; B23Q 11/005; B23Q 11/0053; B23Q 11/0057; B23Q 11/0067; A22C 17/0006
See application file for complete search history.

(56) References Cited

U.S. PATENT DOCUMENTS 2,585,957 A * 2/1952 Meeker .................. B23D 55/02 312/283
2,604,126 A * 7/1952 Wiken ................... B23D 55/06 83/810
3,669,163 A * 6/1972 Crane ................ B23Q 11/0046 83/788
4,063,478 A * 12/1977 Stuy ..................... B23D 59/006 83/100

(Continued)

FOREIGN PATENT DOCUMENTS

EP 0185292 A1 * 6/1986 ............. A22B 5/208
JP 2004009271 A * 1/2004

OTHER PUBLICATIONS

English language translation of JP-2004009271-A to Wada Kimio.*
English language translation of EP-0185292-A1 to Schweighardt.*

*Primary Examiner* — Evan H Macfarlane
(74) *Attorney, Agent, or Firm* — MUNCY, GEISSLER, OLDS & LOWE, P.C.

(57) ABSTRACT

A dust collection structure of the band saw machine includes a fixed cover surrounding a saw band and having a fixed portion fixed to a fixed table and a first lateral plate provided with a first bevel edge fitted to a pivotal direction of a worktable, a fixed member fixing the fixed cover to the fixed table, a movable cover having a second front plate pivotally connected to the fixed cover and a second lateral plate abutted with the first lateral plate of the fixed cover so as to be pressed by the worktable to pivot relative to the fixed cover, and a spring providing a rebound force to the movable cover. The movable cover can be pivoted by the worktable to solve the problem of poor dust collection effect due to a large gap required between the traditional dust collection structure and the worktable.

10 Claims, 12 Drawing Sheets

(56) References Cited

U.S. PATENT DOCUMENTS

| | | | | |
|---|---|---|---|---|
| 4,213,253 | A * | 7/1980 | Gudelis | G09B 23/183<br>434/224 |
| 4,255,995 | A * | 3/1981 | Connor | B23Q 11/0046<br>83/100 |
| D292,407 | S * | 10/1987 | Legler | D15/133 |
| 4,721,023 | A * | 1/1988 | Bartlett | B27G 19/02<br>83/477.1 |
| 8,844,415 | B2 * | 9/2014 | Taylor | B23D 59/006<br>83/99 |
| 11,858,167 | B2 * | 1/2024 | Kovács | B27B 5/24 |
| 2004/0007109 | A1 * | 1/2004 | Chiang | B08B 15/04<br>83/788 |
| 2004/0154446 | A1 * | 8/2004 | Chang | B23D 59/006<br>83/788 |
| 2017/0252841 | A1 * | 9/2017 | Wang | B27G 19/025 |

* cited by examiner

DUST COLLECTION STRUCTURE OF BAND SAW MACHINE

BACKGROUND OF THE INVENTION

1. Field of the Invention

The present invention relates to band saw machines and more particularly, to a dust collection structure of a band saw machine.

2. Description of the Related Art

In traditional band saw machines, the dust collection structure must maintain a significant distance from the worktable because the worktable can be tilted to a predetermined angle. Otherwise, the dust collection structure will interfere and collide with the worktable, so that sawdust falls through the gap between the dust collection structure and the worktable, leading to ineffective dust collection. Therefore, there is still room for improvement.

SUMMARY OF THE INVENTION

It is one objective of the present invention to provide a dust collection structure of a band saw machine, which To attain the above objective, the dust collection structure of the band saw machine a fixed cover, a fixed member, a movable cover, and a spring. The fixed cover has a fixed portion fixed to a fixed table of the band saw machine, a first front plate, a first rear plate corresponding to the first front plate, and a first lateral plate connected with the first front plate and the first rear plate, such that the fixed cover surrounds a saw blade. In addition, the first lateral plate has a first bevel edge fitted to a pivotal direction of a worktable pivotally connected to the fixed table. The fixed member is configured to fix the fixed cover to the fixed table through the fixed portion of the fixed cover. The movable cover is pivotally connected to the fixed cover and pressed by the worktable to pivot relative to the fixed cover. In addition, the movable cover has a second front plate pivotally connected to the first front plate of the fixed cover and a second lateral plate abutted against the first lateral plate of the fixed cover. The spring is disposed between the fixed cover and the movable cover to provide a rebound force to the movable cover.

It can be seen from the above that by pivotally connecting the movable cover to the fixed cover, the movable cover is pressed by the worktable to pivot when the worktable is tilted. This can prevent sawdust from leaking out and facilitate easy dust suction to achieve the purpose of the present invention.

Preferably, a pivot member is pivotally connected to a first pivotal portion of the fixed cover and a second pivotal portion of the movable cover.

Preferably, the fixed portion of the fixed cover is connected with the first front plate.

Preferably, the fixed portion of the fixed cover is connected with the first lateral plate.

Preferably, the fixed portion of the fixed cover is connected with the first rear plate.

Preferably, the fixed member is a magnetic member.

Preferably, the fixed member is installed in an installation hole of the fixed portion of the fixed cover.

Preferably, the fixed cover has a first stop portion stopped against a second stop portion of the movable cover.

Preferably, the second lateral plate of the movable cover has a second bevel edge close to the first bevel edge of the fixed cover.

Preferably, the first rear plate has a first escape opening corresponding to an arced frame of the worktable, and the second front plate has a second escape opening corresponding to the arced frame of the worktable.

Other advantages and features of the present invention will be fully understood by reference to the following specification in conjunction with the accompanying drawings, in which like reference signs denote like components of structure.

DETAILED DESCRIPTION OF THE INVENTION

Figure 1:
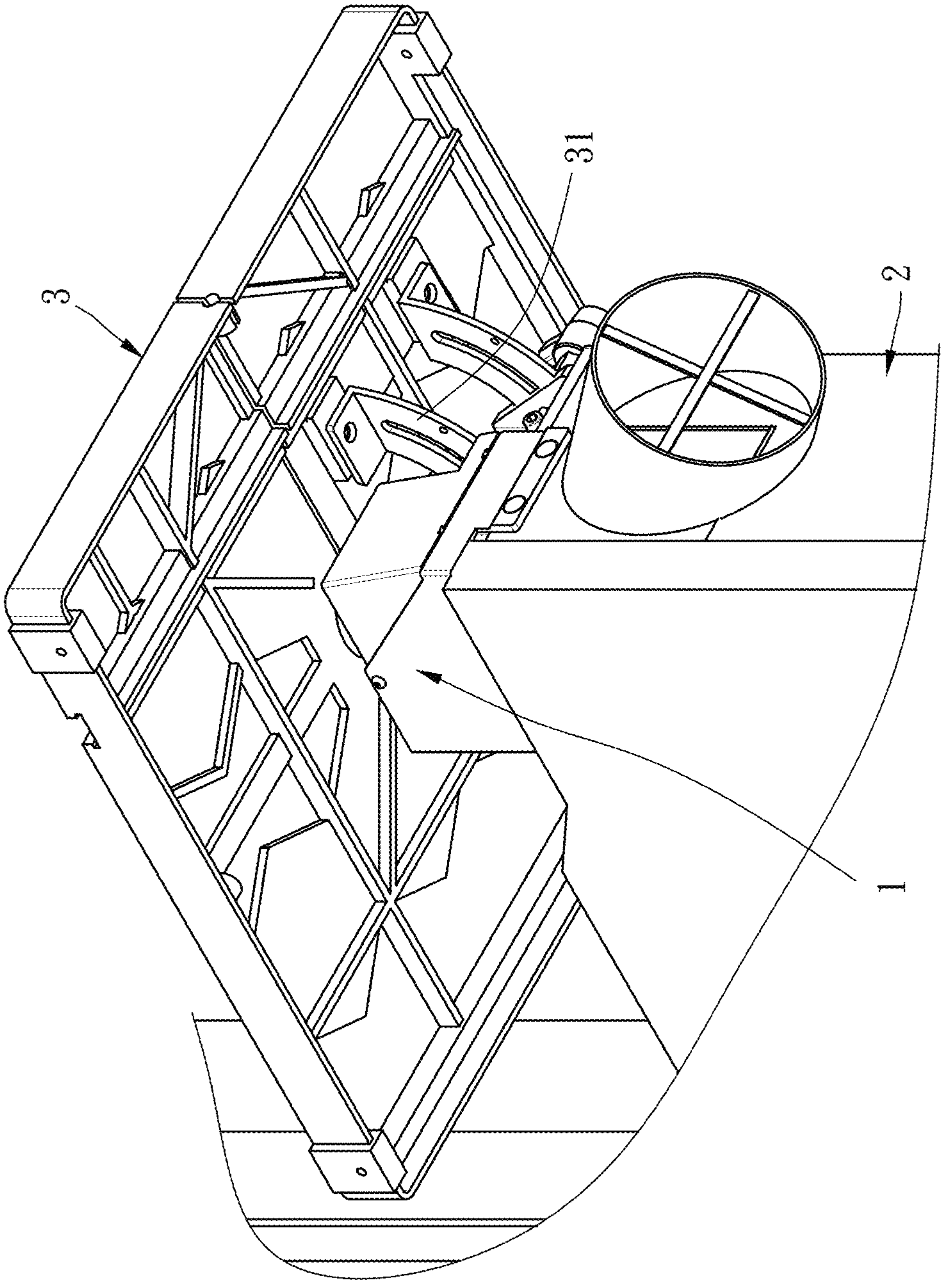
FIG. 1 is a perspective view of a dust collection structure of the present invention, in which the dust collection structure is installed on a band saw machine.
Figure 2:
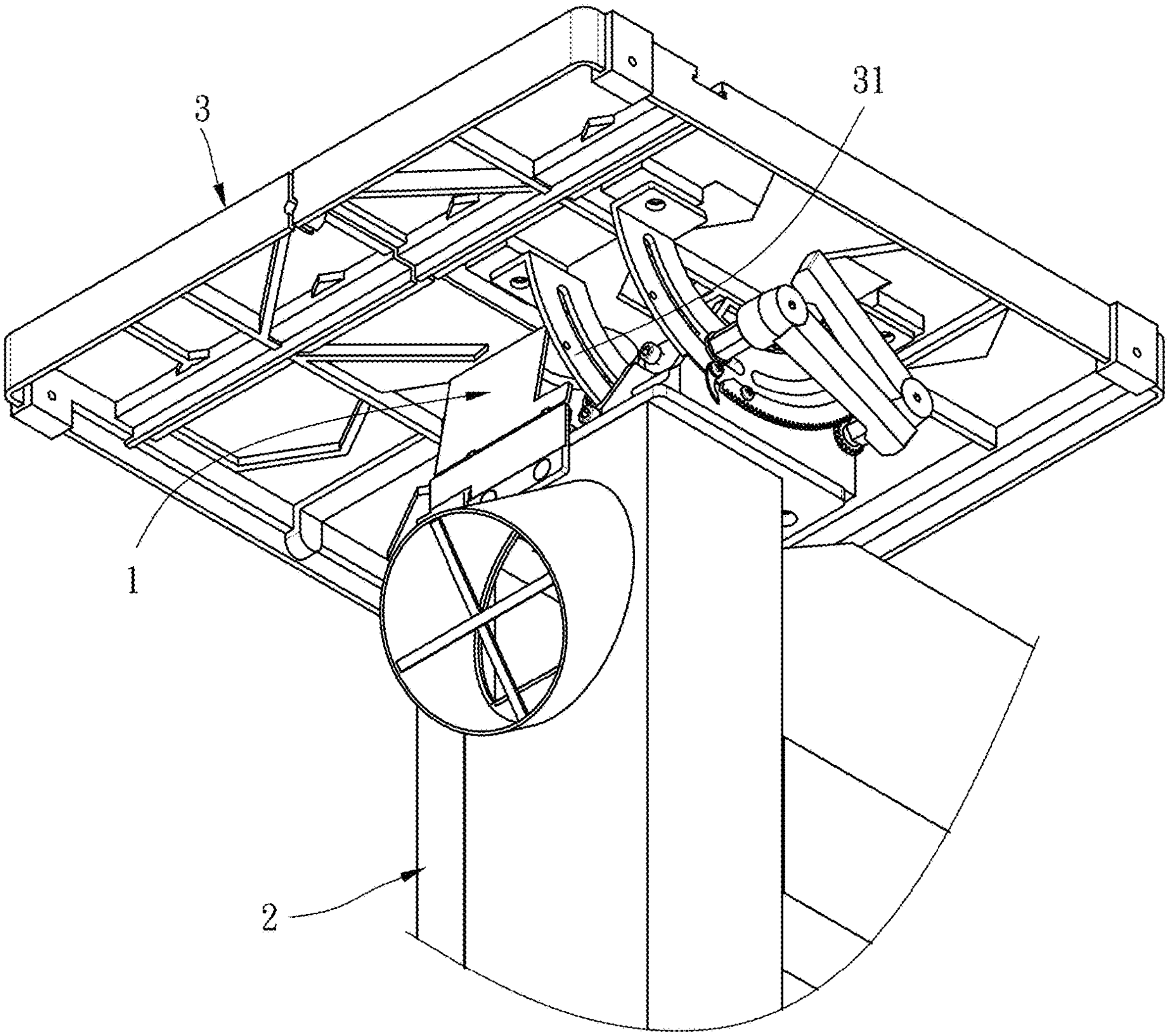
FIG. 2 is another view of FIG. 1.
Figure 3:
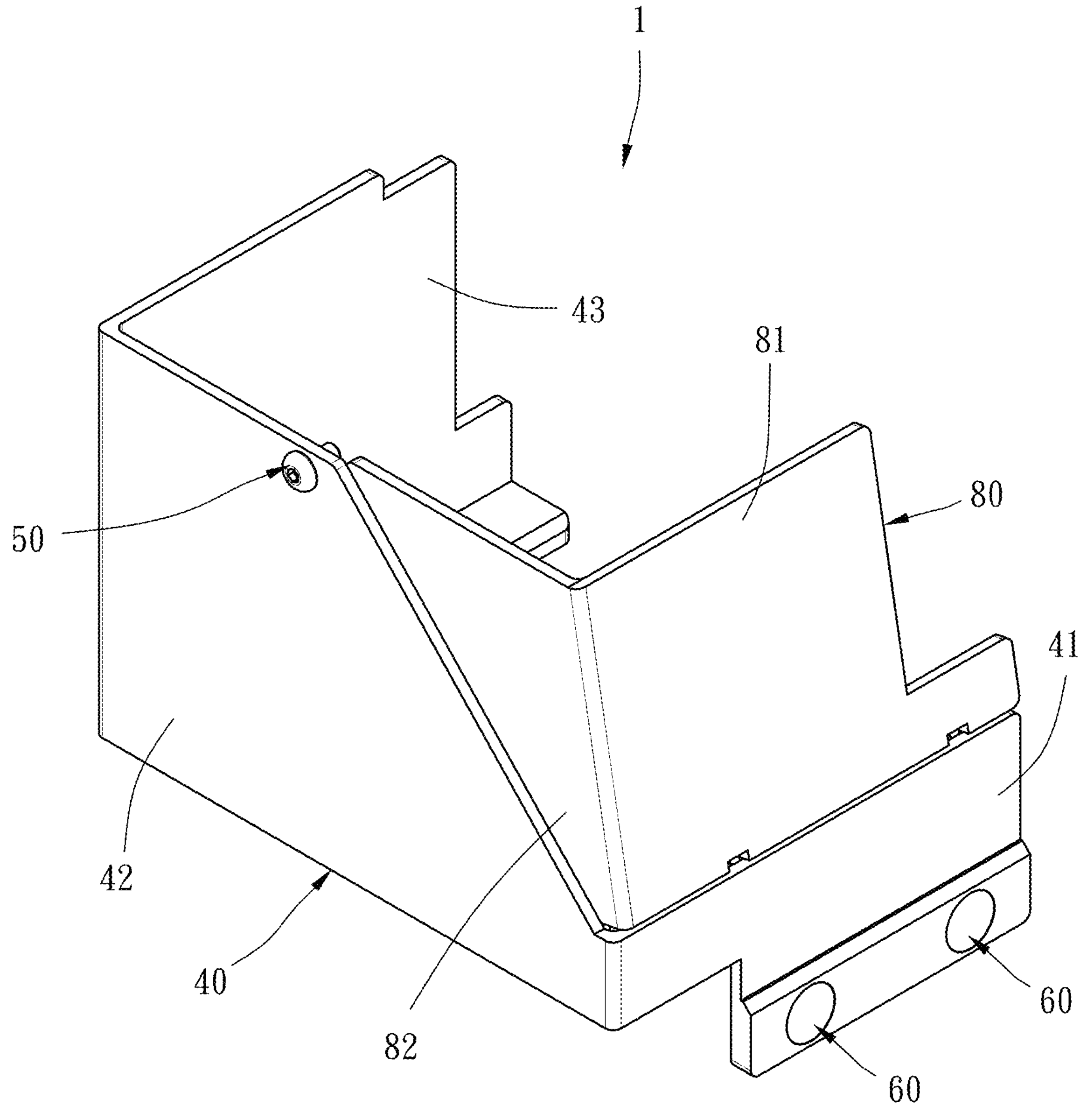
FIG. 3 is a perspective view of the dust collection structure of the present invention.
Figure 4:
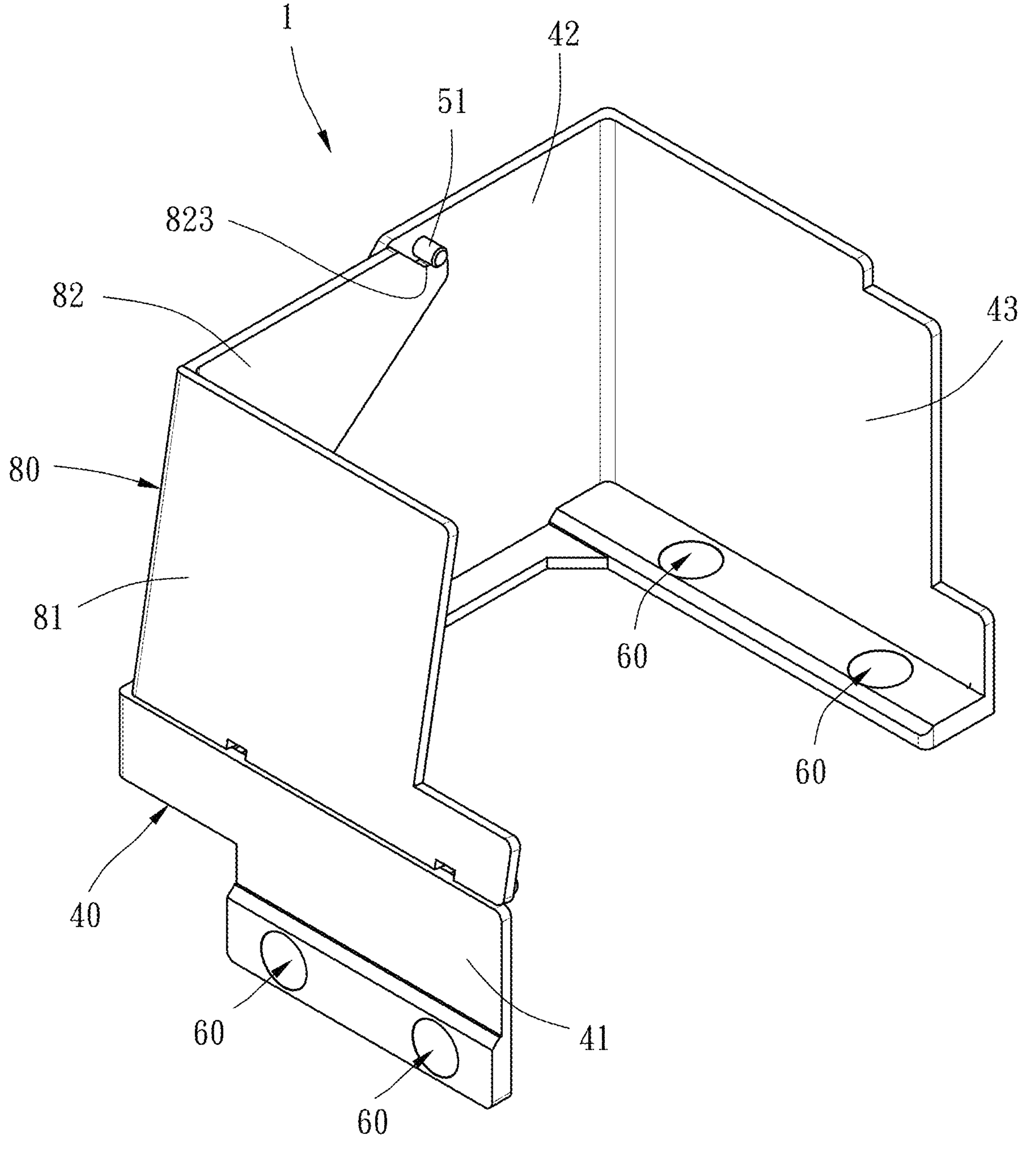
FIG. 4 is another perspective view of the dust collection structure of the present invention.
Figure 5:
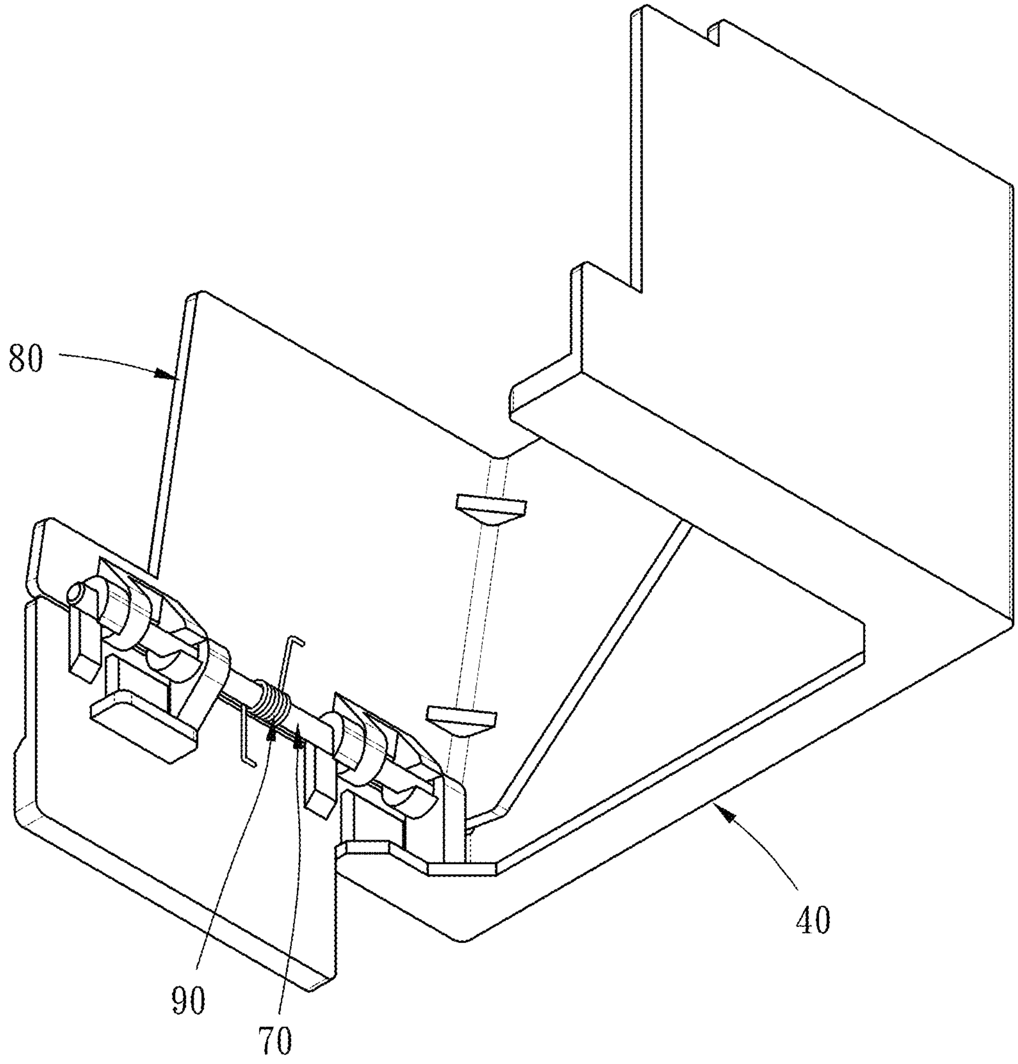
FIG. 5 is another perspective view of the dust collection structure of the present invention.
Figure 6:
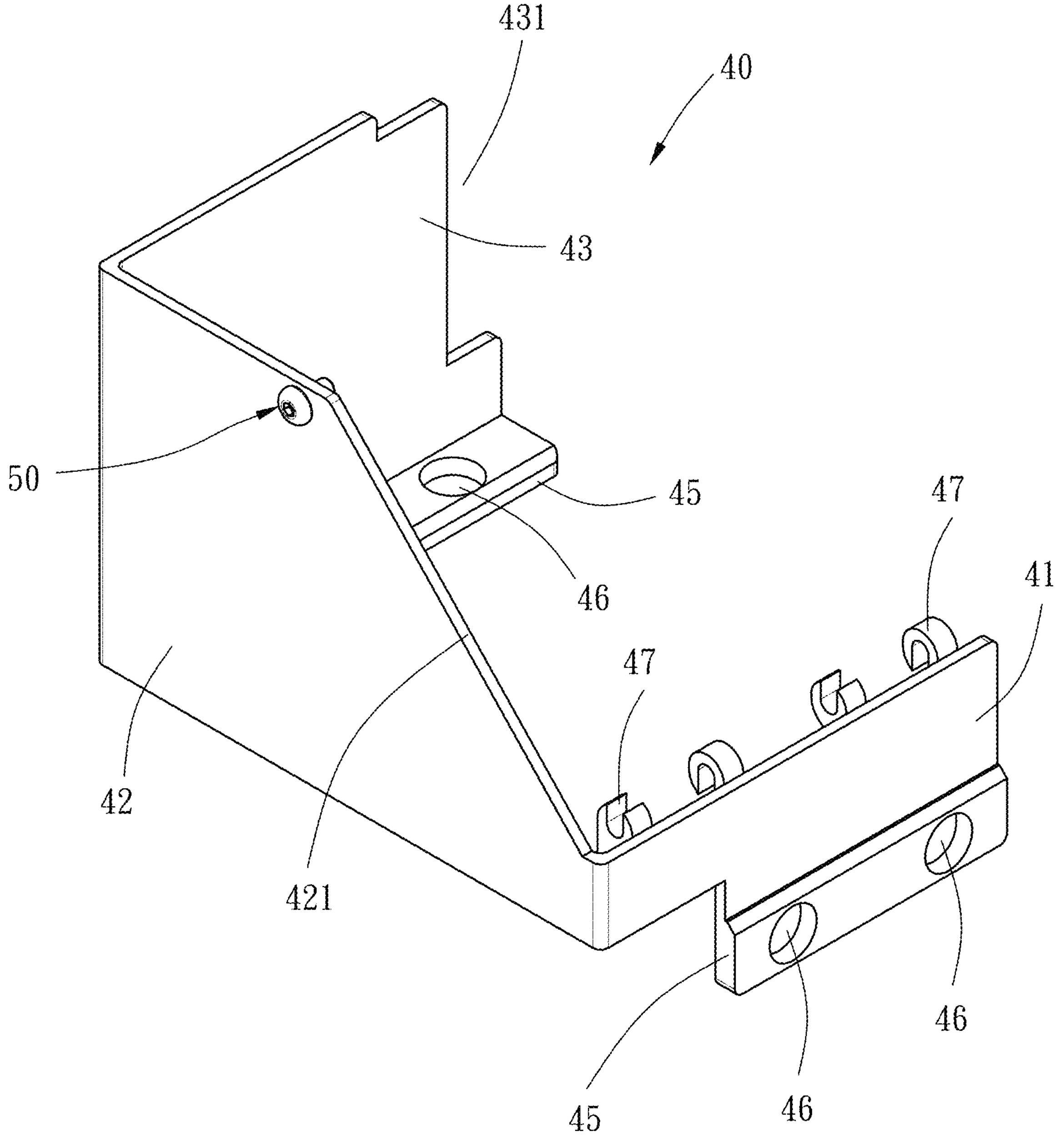
FIG. 6 is a perspective view of a fixed cover provided by the dust collection structure of the present invention.
Figure 7:
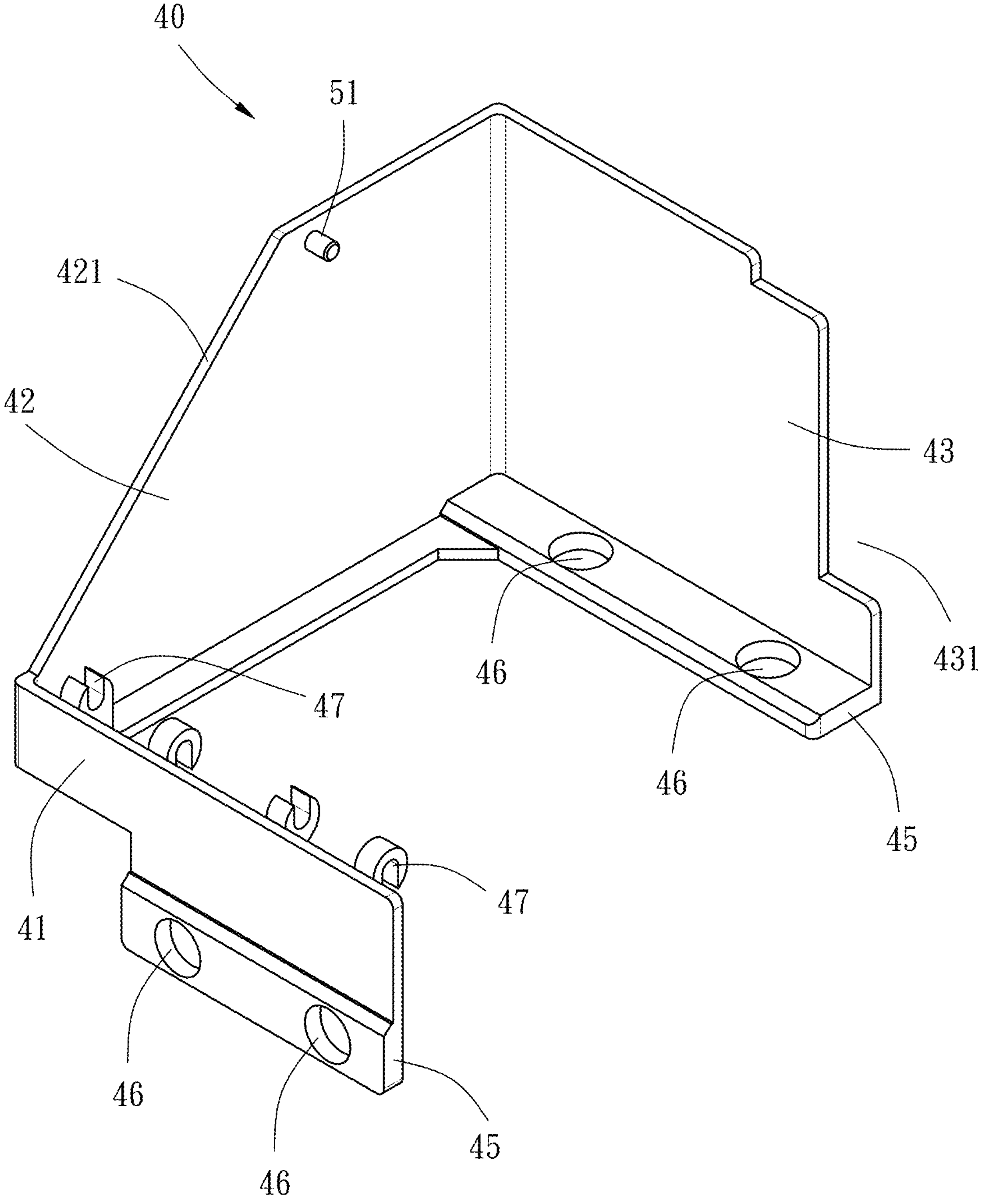
FIG. 7 is another perspective view of a fixed cover provided by the dust collection structure of the present invention.
Figure 8:
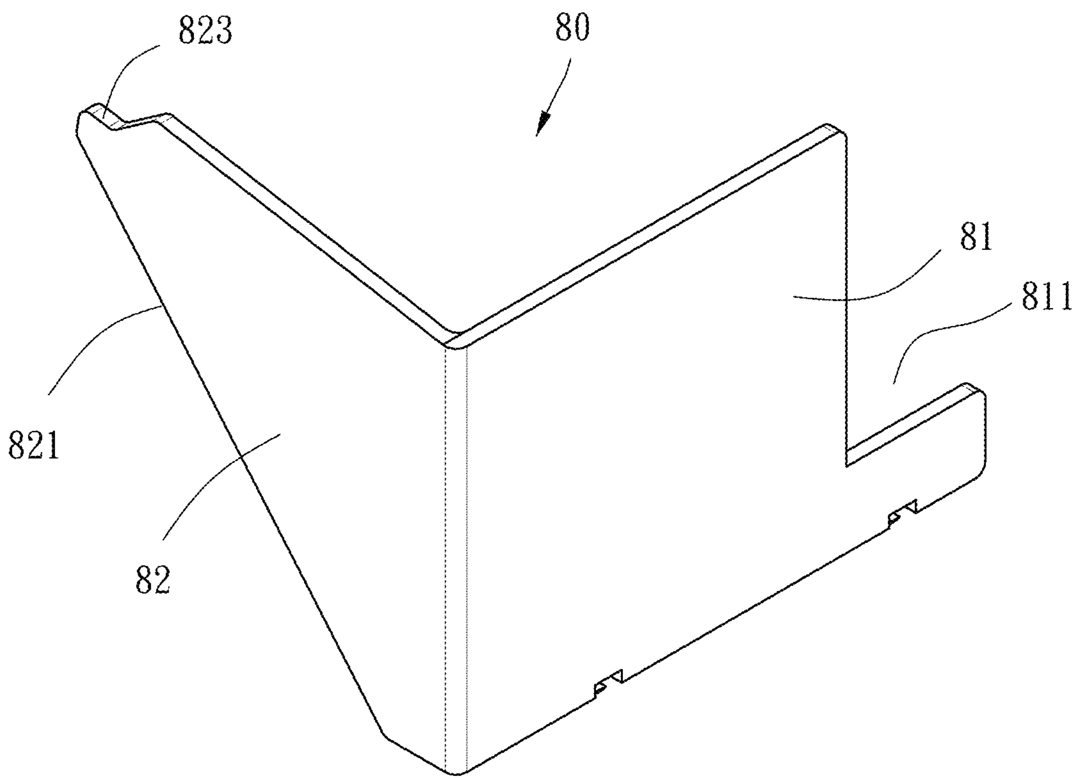
FIG. 8 is a perspective view of a movable cover provided by the dust collection structure of the present invention.
Figure 9:
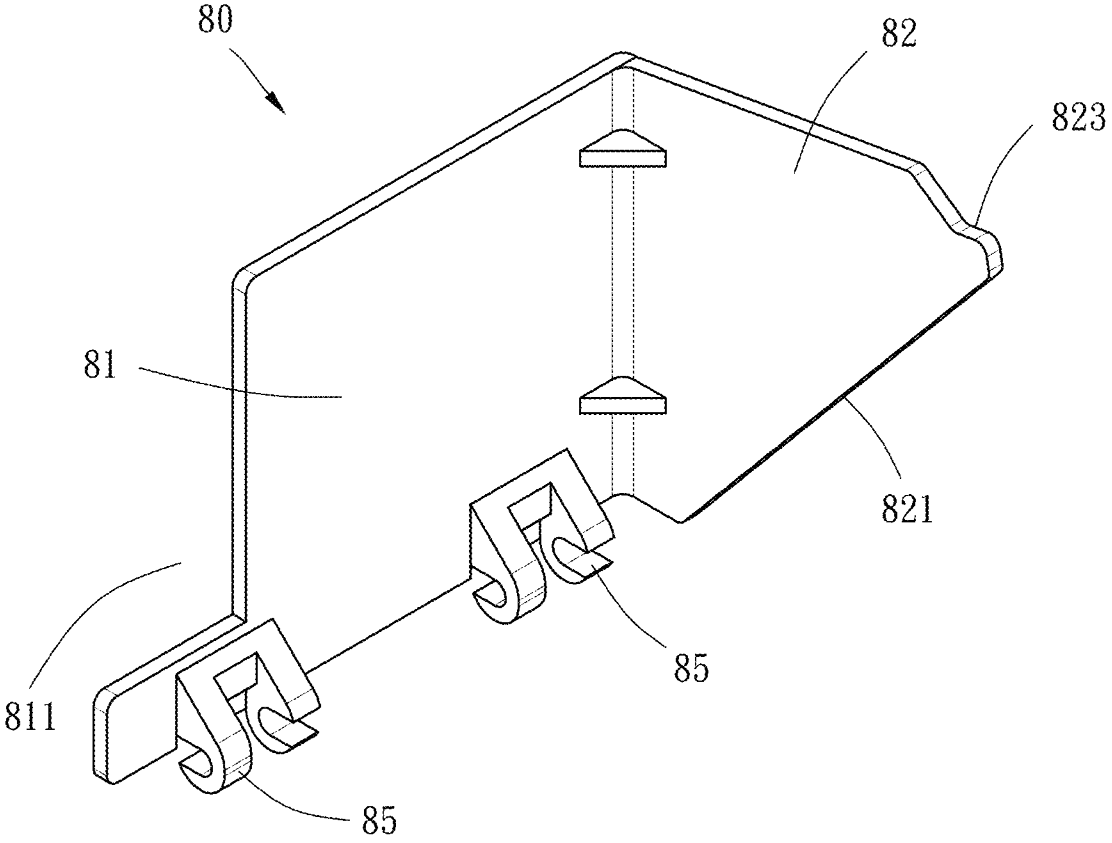
FIG. 9 is another perspective view of a movable cover provided by the dust collection structure of the present invention.

As shown in FIGS. 1-9, a dust collection structure 1 of the present invention is installed on a band saw machine. The band saw machine comprises a fixed table 2, a worktable 3 pivotally connected with the fixed table 2, and a saw band (not shown).

The dust collection structure 1 comprises a fixed cover 40, a plurality of fixed members 60, a pivot member 70, a movable cover 80, and a spring 90.

The fixed cover 40 includes a first front plate 41, a first lateral plate 42, a first rear plate 43, two fixed portions 45, a first pivot portion 47, and a first stopper 50. The first lateral plate 42 is connected with the first front plate 41 and the first rear plate 43 so as to surround the saw band. The first lateral plate 42 has a first bevel edge 421 fitted to a pivotal direction of the worktable 3. The first rear plate 43 has a first escape opening 431 corresponding to an arced frame 31 of the worktable 3. The two fixed portions 45 are connected with the bottoms of the first front and rear plates 41, 43 for fixing to the fixed table 2, and the two fixed portions 45 each have a plurality of installation holes 46. The first pivot portion 47 is located at the top edge of the first front plate 41. The first stopper 50 is attached to the first lateral plate 42 and provided with a first stop portion 51 located at the inner side of the first lateral plate 42.

The fixed member 60 is used to fix the fixed cover 40 to the fixed table 2. In this embodiment, the fixed member 60 is a magnetic member, and the fixed table 2 is made of magnetic metal material. The fixed members 60 are fixed in the installation holes 46 of the fixed cover 40.

The pivot member 70 is attached to the first pivot portion 47 of the fixed cover 40.

The movable cover 80 includes a second front plate 81, a second lateral plate 82, and a second pivot portion 85. The second front plate 81 is abutted against the worktable 3, and further, the second front plate 81 corresponds to the first front plate 41 of the fixed cover 40 and has a second escape opening 811 corresponding to the arced frame 31 of the worktable 3. The second lateral plate 82 is connected with the second front plate 81 and abutted with the first lateral plate 42 of the fixed cover 40. The second lateral plate 82 has a second bevel edge 821 close to the first bevel edge 421 of the fixed cover 40 and a second stop portion 823 stopped against the first stop portion 51 of the first stopper 50 of the fixed cover 40. The second pivot portion 85 is located below the second front plate 81 and pivotally connected to the pivot member 70. As such, the movable cover 80 can be pressed by the worktable 3 to pivot relative to the fixed cover 40.

The spring 90 is a torsion spring in this embodiment. The spring 90 is sleeved on the pivot member 70 and has two ends thereof abutted against the first front plate 41 of the fixed cover 40 and the second front plate 81 of the movable cover 80 for providing a rebound force to the movable cover 80.

When the worktable 3 is horizontal and not tilted, the movable cover 80 is close to the bottom of the worktable 3, and the upper edges of the second front plate 81 and the second lateral 82 of the movable cover 80 are very close to the worktable 3 or abutted with the worktable 3, such that the sawdust is not easy to fall out from between the movable cover 80 and the worktable 3.

Figure 10:
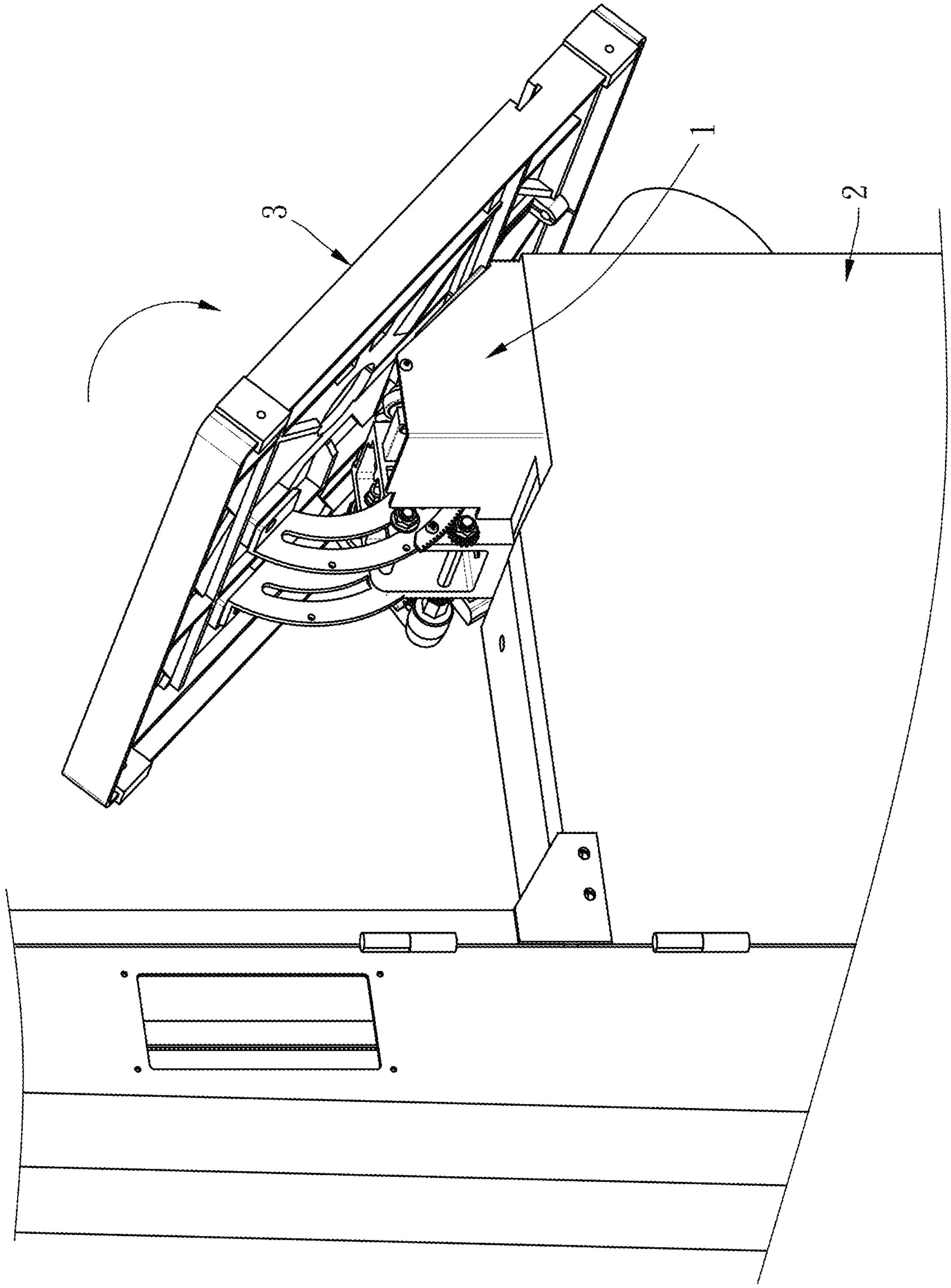
FIG. 10 is similar to FIG. 1, showing that the worktable is pivoted.
Figure 11:
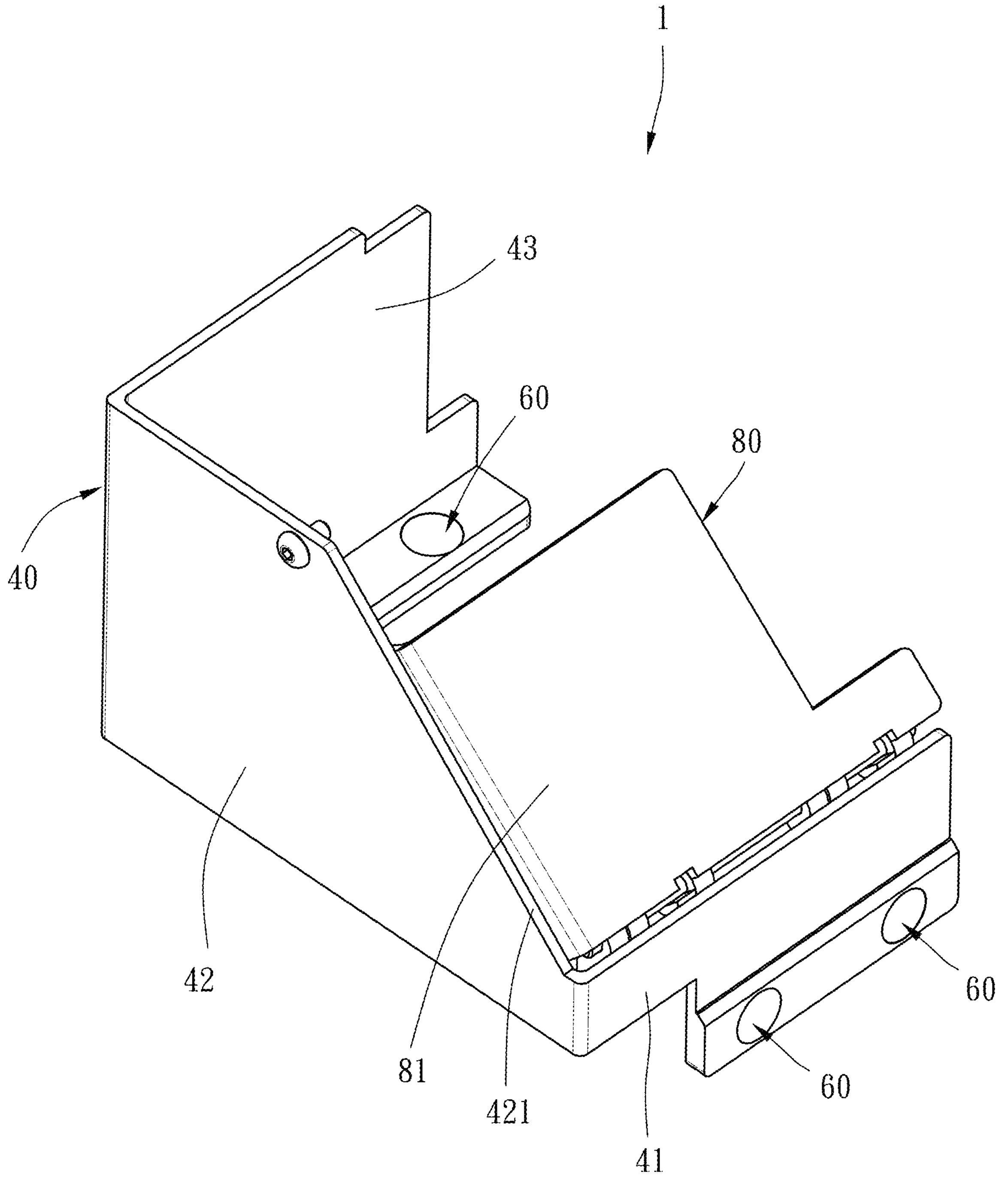
FIG. 11 is a perspective view of the dust collection structure of the present invention, in which the movable cover is deflected relative to the fixed cover.
Figure 12:
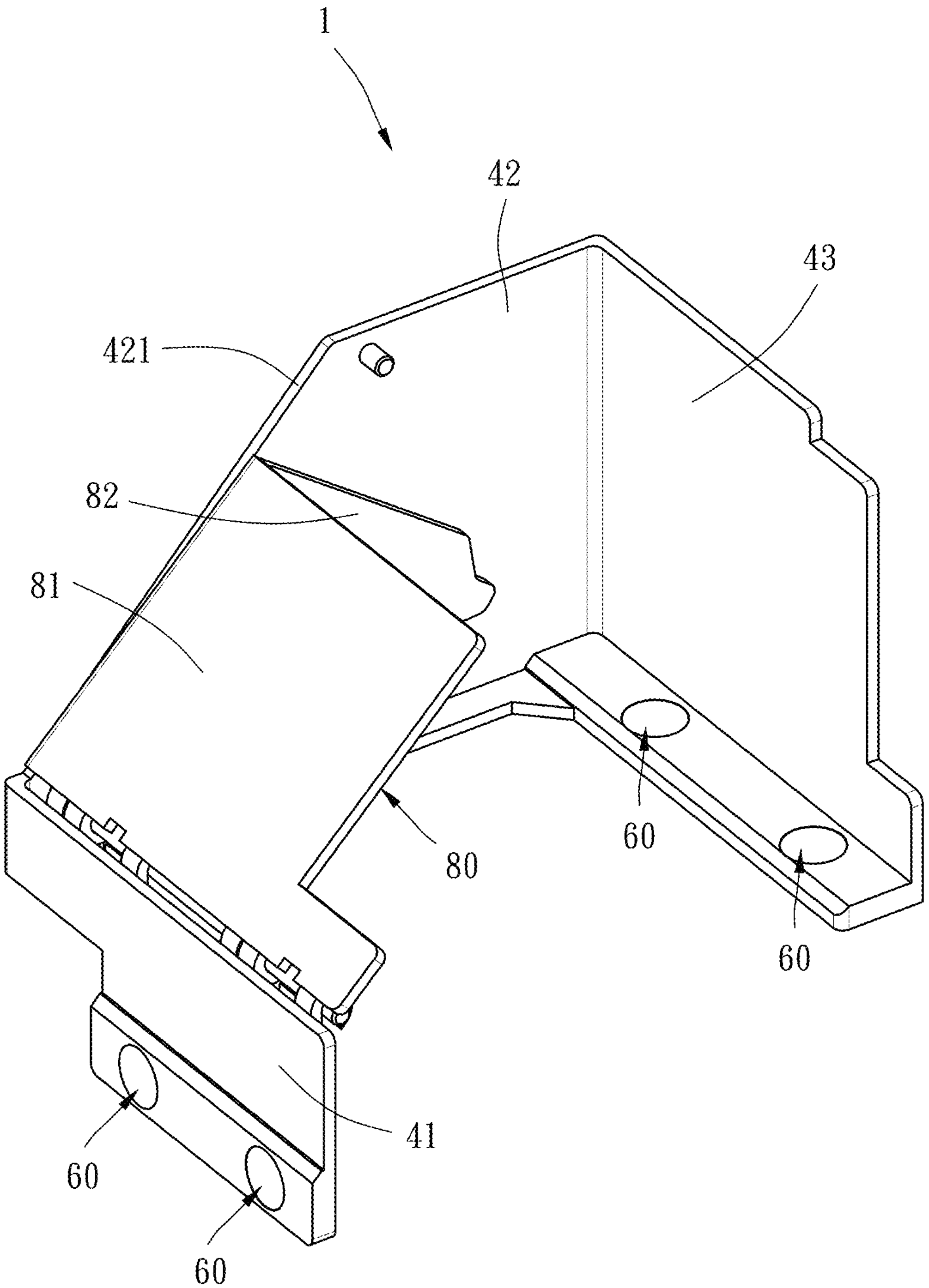
FIG. 12 is another view of FIG. 11.

As shown in FIGS. 10-12, when the worktable 3 is tilted at an angle, the movable cover 80 is pressed by the worktable 3 to pivot relative to the fixed cover 40 with the pivot member 70 as the center. At this time, the upper edges of the second front plate 81 and the second lateral plate 82 still remain close to the worktable 3, such that the sawdust cannot easily fall out from between the movable cover 80 and the worktable 3.

In accordance with the aforementioned structure, the dust collection structure 1 of the present invention prevents sawdust from leaking out and makes it easy to be sucked out, thus achieving the purpose of the present invention.

Additionally, since one of the fixed portions 45 of the fixed cover 40 is horizontal and the other of the fixed portions 45 of the fixed cover 40 is vertical, the stability of multi-directional fixation is further enhanced. Furthermore, the movable cover 80 can prevent collision with components of the band saw machine through the second bevel edge 821 during tilting.

In addition to the above embodiment, the present invention can also be implemented as follows:

For example, the pivot member 70 can be directly formed on the fixed cover 40, or the pivot member 70 can be directly formed on the movable cover 80.

Alternatively, the first stop portion 51 and the second stop portion 823 are not necessarily required. The movable cover 80 can be directly abutted against the worktable 3. Alternatively, the first stop portion 51 does not need to be provided on the first stopper 50 and can be integrally formed on the first lateral plate 42 of the fixed cover 40 without the need for the first stopper 50.

Alternatively, fixed portion 45 of the fixed cover 40 is not limited to two in number, and the fixed cover 40 may have one fixed portion 45. The fixed portion 45 can also be connected to the first lateral plate 42.

Alternatively, the fixed member 60 is not limited to multiple in number, and it can be single one in number to achieve the fixed effect.

Alternatively, the fixed member 60 is not limited to the aforesaid magnetic member, but may also be other fixed members, such as a bolt or hook and loop fastener.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dust collection structure for use with a band saw machine, the band saw machine comprising a saw band, a fixed table, and a worktable pivoted to the fixed table, the dust collection structure comprising:

a fixed cover having a fixed portion configured to be fixed to the fixed table, a first front plate, a first rear plate corresponding to the first front plate, and a first lateral plate connected with the first front plate and the first rear plate, such that the fixed cover is configured to surround the saw band, the first lateral plate having a first bevel edge configured to correspond to a pivotal direction of the worktable;

a fixed member configured to fix the fixed cover to the fixed table through the fixed portion of the fixed cover;

a movable cover pivotally connected to the fixed cover and configured to be pressed by the worktable to pivot relative to the fixed cover, the movable cover having a second front plate pivotally connected to the first front plate of the fixed cover and a second lateral plate abutted against the first lateral plate of the fixed cover; and a spring disposed between the fixed cover and the movable cover to provide a rebound force to the movable cover.

2. The dust collection structure as claimed in claim 1, wherein a pivot member is pivotally connected to a first pivotal portion of the fixed cover and a second pivotal portion of the movable cover.

3. The dust collection structure as claimed in claim 1, wherein the fixed portion of the fixed cover is connected with the first front plate.

4. The dust collection structure as claimed in claim 1, wherein the fixed portion of the fixed cover is connected with the first lateral plate.

5. The dust collection structure as claimed in claim 1, wherein the fixed portion of the fixed cover is connected with the first rear plate.

6. The dust collection structure as claimed in claim 1, wherein the fixed member is a magnetic member.

7. The dust collection structure as claimed in claim 6, wherein the fixed member is installed in an installation hole of the fixed portion of the fixed cover.

8. The dust collection structure as claimed in claim 1, wherein the fixed cover has a first stop portion stopped against a second stop portion of the movable cover.

9. The dust collection structure as claimed in claim 1, wherein the second lateral plate of the movable cover has a second bevel edge close to the first bevel edge of the fixed cover.

10. The dust collection structure as claimed in claim 1, wherein the first rear plate has a first escape opening configured to correspond to an arced frame of the worktable, and the second front plate has a second escape opening configured to correspond to the arced frame of the worktable.

* * * * *